United States Patent [19]

Klaveness

[11] Patent Number: 5,438,170
[45] Date of Patent: Aug. 1, 1995

[54] BOREHOLE SEISMIC PULSE GENERATOR AND SYSTEM

[76] Inventor: Alf Klaveness, 12634 Taylorcrest, Houston, Tex. 77024

[21] Appl. No.: 234,257

[22] Filed: Apr. 28, 1994

[51] Int. Cl.⁶ .................. G01V 1/137; G01V 1/40; G01V 1/02
[52] U.S. Cl. ...................... 181/106; 181/113
[58] Field of Search .............. 181/106, 102–104, 181/113, 112; 367/911, 25, 83, 57, 86; 175/1, 40, 50

[56] References Cited

U.S. PATENT DOCUMENTS

| | | | |
|---|---|---|---|
| 2,898,084 | 8/1959 | Eckel et al. | 175/1 |
| 3,845,837 | 11/1974 | McEvers, Jr. et al. | 181/106 |
| 3,993,974 | 11/1976 | Silverman et al. | 367/36 |
| 4,003,017 | 1/1977 | Bailey | 367/81 |
| 4,207,619 | 6/1980 | Klaveness | 367/37 |
| 4,242,209 | 2/1981 | Silverman | 181/106 |
| 4,873,675 | 10/1989 | Barr, Jr. et al. | 367/57 |

*Primary Examiner*—Ian J. Lobo
*Attorney, Agent, or Firm*—James E. Bradley; Max Ciccarelli

[57] ABSTRACT

A seismic pulse generator has a tubular outer member telescopically connected to a tubular concentric inner member. The outer member has a port in its sidewall. A force allows telescopic extension from a contracted position to an extended position. An annular well fluid chamber is located between the sidewalls of the inner and outer members in communication with the port. When at the bottom of the well, the inner and outer members are in the contracted position and the well fluid chamber has a large volume. A delay means controls the rate at which the inner and outer members initially move from the contracted to the extended position. Upon lifting the inner and outer members, the delay apparatus causes the inner and outer members to at first move apart slowly, thus allowing the inner and outer members to be raised substantially together. After a predetermined time interval, the delay apparatus allows the force to move the inner and outer members quickly to the extended position. As the inner and outer members quickly move to the extended position, the volume of the well fluid chamber is rapidly reduced. This rapid reduction in volume causes fluid to be ejected from the port in the sidewall of the outer member, causing a seismic pulse to be generated.

26 Claims, 6 Drawing Sheets

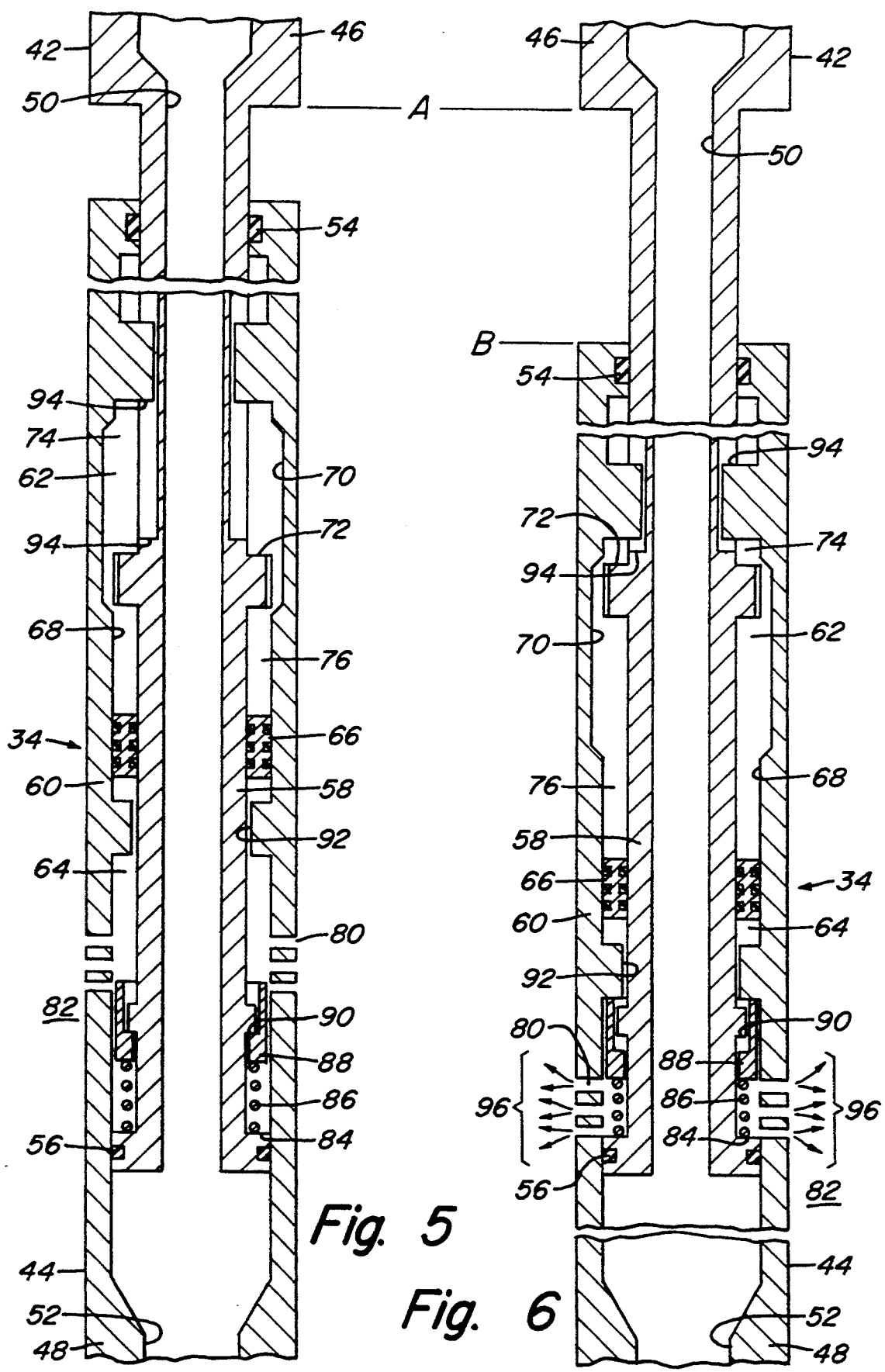

BOREHOLE SEISMIC PULSE GENERATOR AND SYSTEM

BACKGROUND OF THE INVENTION

1. Field of the Invention

This invention relates in general to seismic pulsing devices and in particular to seismic pulsing devices for use in boreholes to create seismic pulses.

2. Description of the Prior Art

The use of seismic waves to determine the geophysical and geological structure and characteristics of a subterranean region is well known. In a typical application, sonic wave detectors, or seismometers, are arranged on the surface above the region to be explored. A seismic source is triggered to emit one or a series of seismic pulses. The array of seismometers arranged at the surface detects pulses passing through the earth formations. Typically, this procedure is not performed while drilling a well for oil or gas, but instead is used in earlier exploration programs to find the best location for drilling a well.

An example of a seismic data gathering system which is employed while drilling an oil or gas well is shown in U.S. Pat. No. 4,207,619, issued on Jun. 10, 1980 to Alf Klaveness. The '619 patent teaches using any suitable seismic pulse generator placed in the drill string near the drill bit and advanced in the well together with the drill bit to generate seismic pulses at any depth and without the need to remove the drill string and thus interrupt drilling operations. Sensors spaced laterally from the drilling rig detect the seismic pulses.

Seismic pulse generators for use with drill strings are shown in prior patents, however, they are not in commercial use. A need exists for a robust pulse generator that is simple to operate, that functions effectively under various drilling conditions, and generates omni-directional seismic pulses of suitable force and frequencies to delineate geologic structure around and below the borehole to distances of 4,000 feet or more. A need also exists for a pulse generator having the above qualities that can also be operated without substantial interruption of, or hindrance to, the drilling operations.

SUMMARY OF THE INVENTION

It is the general objective of this invention to provide a seismic pulse generator that can meet the above needs and at the same time provide much useful seismic information to improve the safety and efficiency of drilling operations.

The seismic pulse generator of this invention has a tubular outer member telescopically connected to a tubular concentric inner member. The outer member has one or more adjustable ports in its sidewall. A force means causes telescopic extension from a contracted position to an extended position. An annular well fluid chamber is located between the sidewalls of the inner and outer members in communication with the ports. When the apparatus is at the bottom of the well, the inner and outer members are in the contracted position and the well fluid chamber has a large volume.

A delay means controls the rate at which the inner and outer members initially move from the contracted to the extended position. Upon lifting the inner and outer members, the delay means causes the inner and outer members to at first move apart slowly, thus allowing the inner and outer members to be raised substantially together. After a predetermined time interval, of approximately twenty seconds, the delay means allows the force means to move the inner and outer members quickly to the extended position.

As the inner and outer members quickly move to the extended position, the volume of the well fluid chamber is rapidly reduced. This rapid reduction in volume causes fluid to be ejected from the ports in the sidewall of the outer member causing a robust seismic pulse to be generated, which has suitable force and frequency to accomplish the design objectives.

In the preferred embodiment, the pulse generator is connected into a drill string. The weight of the drill string above the pulse generator provides the needed weight to move the inner and outer members to the contracted position when the assembly is at the bottom of the borehole. The primary force means comprises fluid pressure applied from the surface and acting within the string to move the inner and outer members apart from each other and to the extended position. The preferred embodiment also comprises a supplemental force means comprising one or more conduits, such as drill collars, positioned below the pulse generator to assist in moving the inner and outer members apart from each other. The supplemental force means is an optional force means that can be used when sufficient fluid pressure cannot be generated within the string. Also, in appropriate situations, either the fluid pressure or the conduits can be used as the exclusive force means.

In a second embodiment, the pulse generator is connected at the end of a wireline and the force means comprises one or more conduits, such as drill collars, positioned above and below the pulse generator. The conduits above the pulse generator provide the force needed to move the inner and outer members to the contracted position when the assembly is at the bottom of the borehole. The conduits below the pulse generator provide the force needed to move the inner and outer members apart from each other and to the extended position when the assembly is raised from the bottom of the borehole. This embodiment is employed in cased or open non-drilling wells. This embodiment is particularly useful in previously drilled wells. Here, pump pressure and weight of drill string are not available as force means. This embodiment will be very useful for enhanced oil recovery programs in old depleted and partially depleted fields by imaging the path and progress of injected fluids.

The above as well as additional objects, features, and advantages will become apparent in the following description.

BRIEF DESCRIPTION OF THE DRAWINGS

FIG. 5 is a schematic of the apparatus of FIG. 3, but shown just after the outer member begins moving rapidly downward.

FIG. 6 is a schematic of the apparatus of FIG. 3, but shown in the fully extended position.

DETAILED DESCRIPTION OF THE INVENTION

Figure 1:
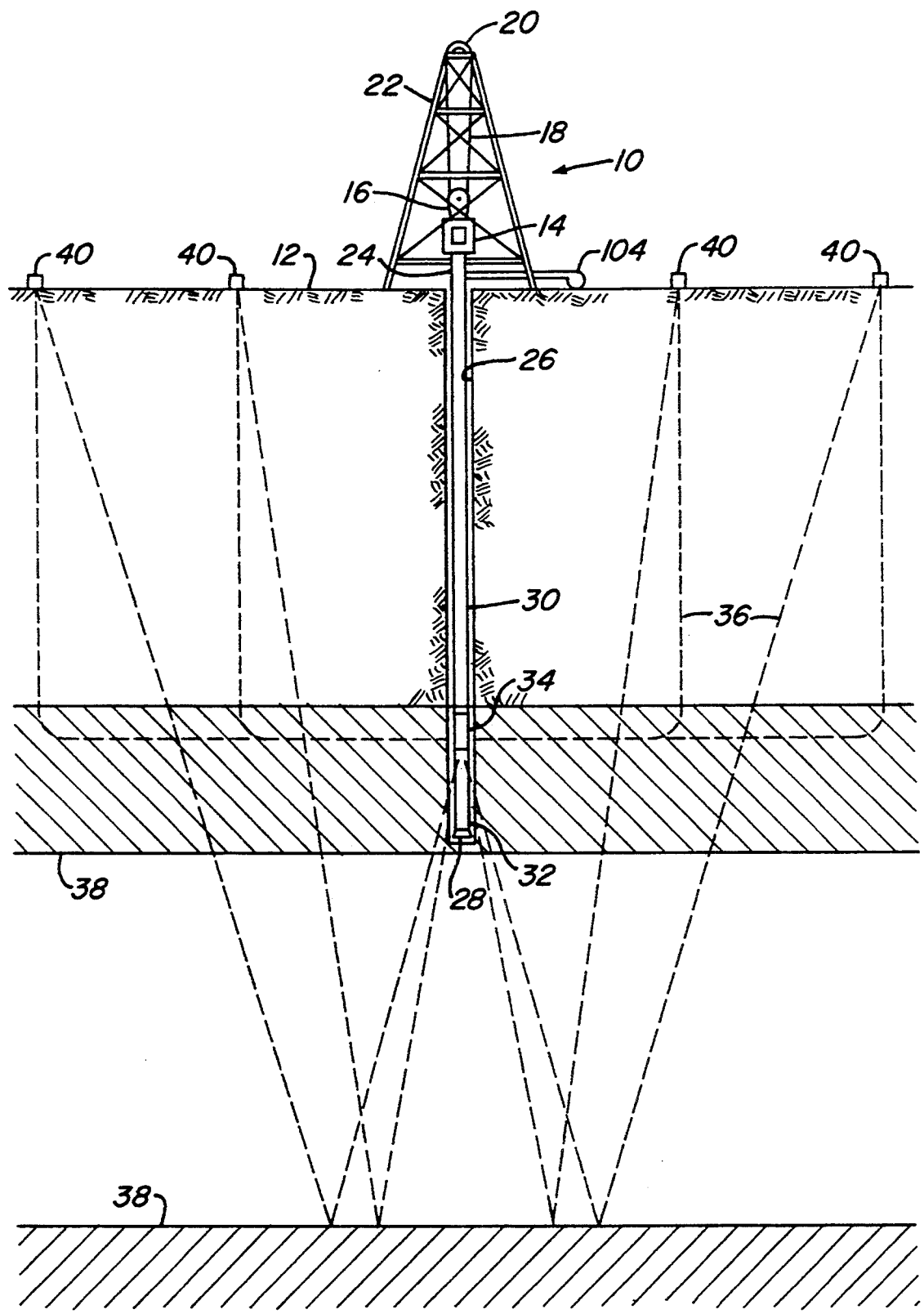
FIG. 1 is a schematic representation of data being obtained by means of the present invention.

FIG. 1 illustrates a typical data-gathering operation. The usual well-drilling support equipment shown generally at 10 is located on ground, or surface, 12 and includes a swivel 14, supported by a travelling block 16 which is suspended by a cable 18 from a crown block 20 atop a derrick 22.

A drill string 24 extends into the well bore 26 being drilled and terminates in a drill bit 28. The drill string 24 comprises a plurality of sections of drill pipe 30 and at least one section of drill collar 32. As well bore 26 is made deeper, additional sections of drill pipe 30 are added to the top of drill string 24. Located in drill string 24 is a pulse generator 34. Pulse generator 34 is used to generate a fluid pulse which causes seismic waves 36 to propagate away from pulse generator 34 and to pass through, or reflect from, various earth formations 38. A single fluid pulse generates a waveform of low frequency, approximately 10–120 cycles per second.

Figure 8:
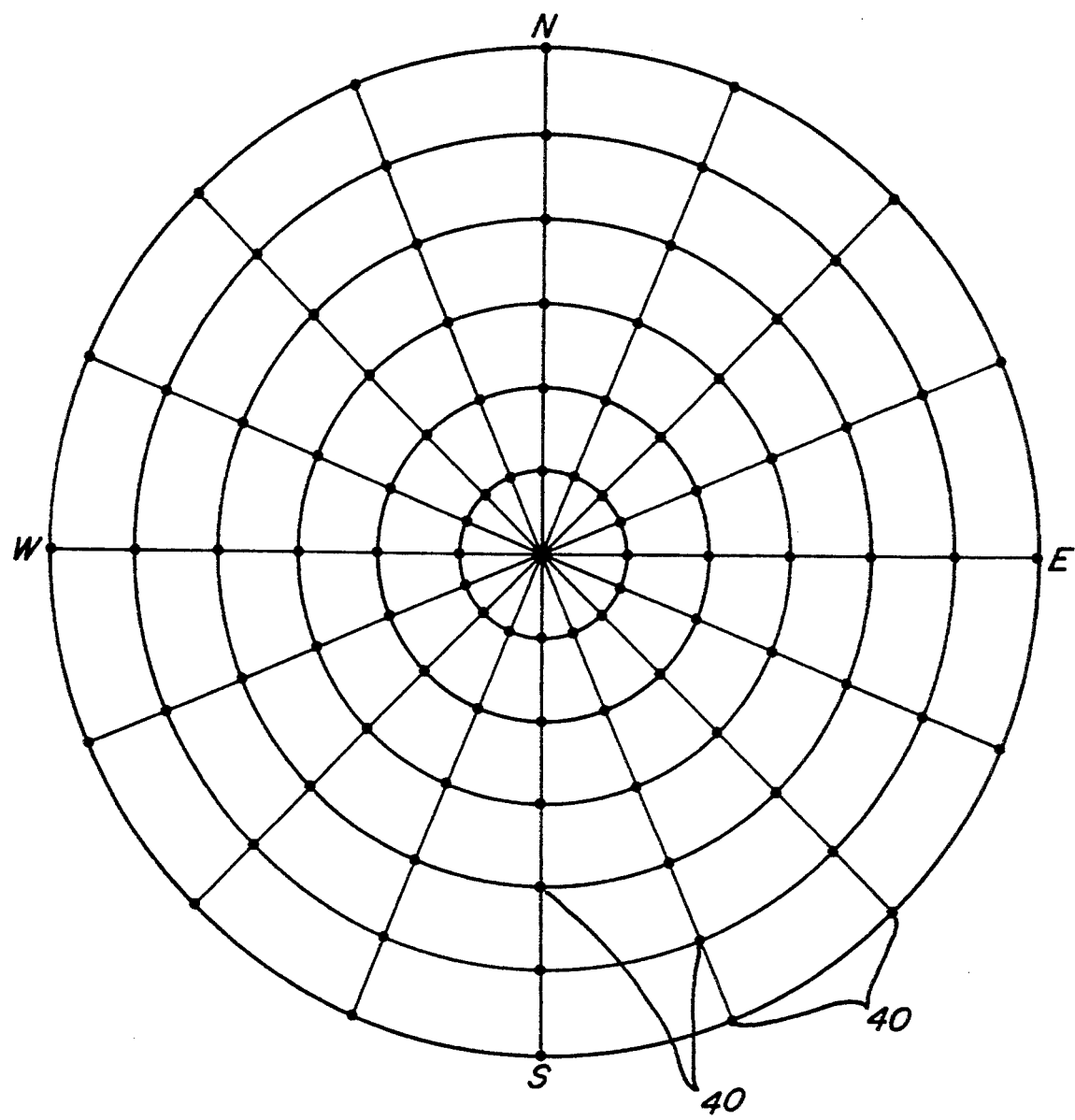
FIG. 8 is a schematic diagram showing a preferred arrangement, as seen from above the well bore, of sensors around the well bore.

On ground 12, seismic detectors, or sensors, 40 are positioned laterally about well bore 26. FIG. 8 shows a preferred arrangement of sensors 40 around well bore 26. The data from sensors 40 is used to determine geological structure and other information related to the drilling operation.

Figure 2:
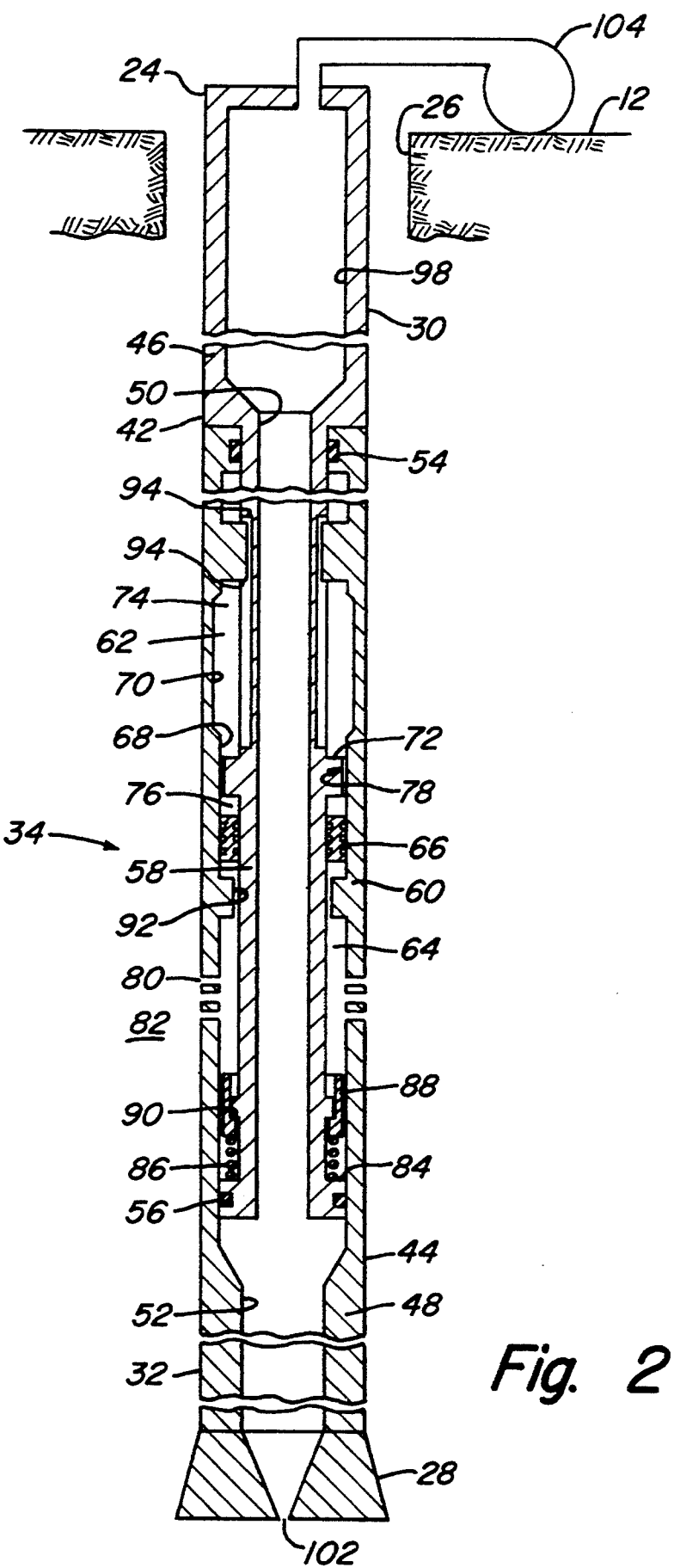
FIG. 2 is a schematic of a vertical cross section of the pulse generator of the present invention, shown in the contracted position.

FIG. 2 shows a schematic representation of the preferred embodiment of the present invention, shown in the contracted position. Pulse generator 34 is attached to the end of drill string 24 which is suspended from the surface by conventional means not shown in FIG. 2. One or more drill collars 32 are located below pulse generator 34. Drill bit 28 is connected to the lowest drill collar by a conventional bit sub (the bit sub is not shown). Pump 104 is connected to selectively pump drill fluid into drill string 24. Conventional means for conducting drilling operations are also provided but are not shown in FIG. 2.

Figure 3:
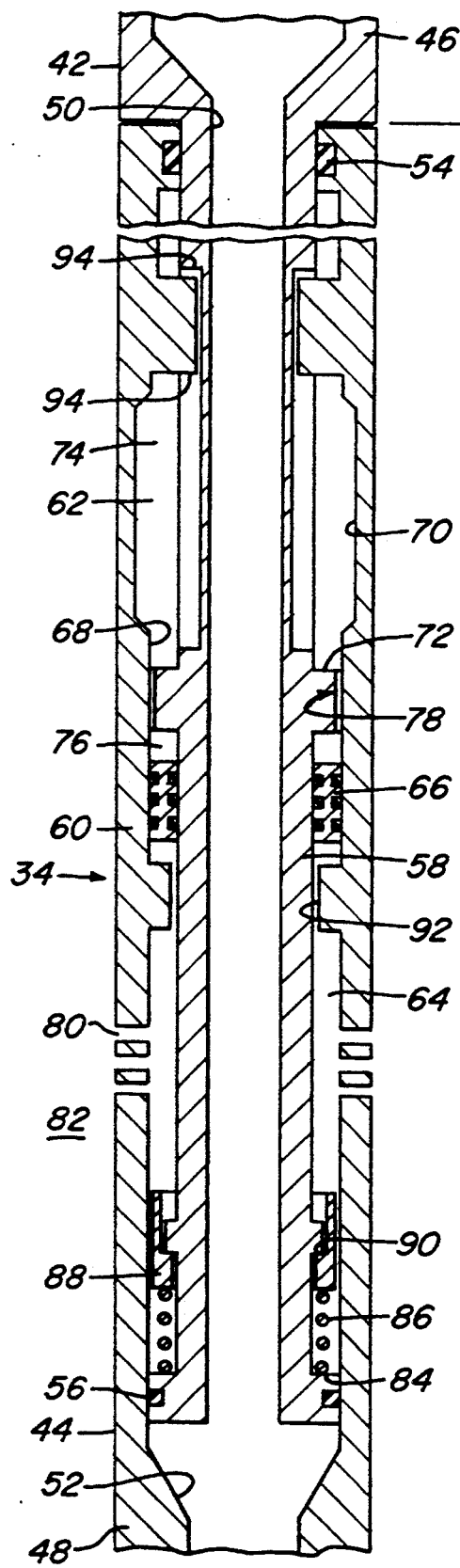
FIG. 3 is a schematic of a portion of the apparatus of FIG. 2, also shown in the contracted position.

Referring now primarily to FIG. 2 and FIG. 3, inner member 42 and outer member 44 are tubular members concentrically located one within the other. The upper portion 46 of inner member 42 is connected to drill pipe 30 of drill string 24. The lower portion 48 of outer member 44 is connected to drill collars 32 which form the lower portion of drill string 24.

Inner member 42 has a longitudinally located passage 50 which communicates with passage 98 extending through drill string 24. Outer member 44 also has a passage 52 which communicates with passage 50 of inner member 42. Passage 52 of outer member 44 is in communication with a passage extending through drill collars 32 and drill bit 28. Annular seals 54 and 56 prevent fluid located in passages 50 and 52 from leaking out of those passages. Passages 50 and 52 and seals 54 and 56 allow drilling fluid to freely pass from drill string 24, through pulse generator 34, through drill collars 32, and through drill bit 28.

Inner member 42 and outer member 44 are connected one to the other so that they can telescope between a contracted position (shown in FIG. 2 and FIG. 3) and an extended position (shown in FIG. 6 and described later).

Inner member 42 has an annular sidewall 58, and outer member 44 has an annular sidewall 60. Sidewalls 58 and 60 define an annular volume between inner member 42 and outer member 44. The annular volume between inner member 42 and outer member 44 is subdivided into two chambers: hydraulic fluid chamber 62 and well fluid chamber 64. Hydraulic fluid chamber 62 and well fluid chamber 64 are sealingly isolated one from the other by floating seal 66.

Seal 54, which provides a seal between outer member 44 and inner member 42, seals the top of hydraulic fluid chamber 62. Floating seal 66 which provides a seal between outer member 44 and inner member 42, seals the bottom of hydraulic fluid chamber 62. Hence, hydraulic fluid chamber 62 is completely enclosed by sidewalls 58 and 60, seal 54, and floating seal 66. Hydraulic fluid substantially fills hydraulic fluid chamber 62. Since the interior of hydraulic fluid chamber 62 is not in communication with the exterior thereof, and since the hydraulic fluid is substantially non-compressible, the volume of hydraulic fluid in chamber 62 is substantially constant. However, floating seal 66 is free to move as needed to equalize pressures in hydraulic fluid chamber 62 and well fluid chamber 64 as drill bit 28 penetrates deeper into the earth and the pressure progressively increases in well fluid chamber 64.

Hydraulic fluid chamber 62 has a section 68 of reduced diameter, and a section 70 of enlarged diameter. A piston-type flange 72 protrudes outwardly from sidewall 58 of inner member 42. Flange 72 has an outer diameter just smaller than the inner diameter of reduced section 68 so as to provide substantial sealing contact with the portion of sidewall 60 located along reduced section 68. Flange 72 partitions hydraulic fluid chamber 62 into an upper volume 74 and a lower volume 76.

A bleed-by passage means, or orifice, 78 extends through flange 72. Orifice 78 is designed so that the fluid flow between upper volume 74 and lower volume 76 is restricted. A variety of known techniques and devices can be used to form orifice 78. In this embodiment, longitudinally oriented grooves are provided along the outer diameter of flange 72. The grooves can be sized so as to provide an orifice 78 of the desired flow capacity.

Floating seal 66, which seals between inner member 42 and outer member 44, provides the seal at the top of well fluid chamber 64. Seal 56, which seals between inner member 42 and outer member 44 provides the seal at the bottom of well fluid chamber 64.

A plurality of ejection ports 80 are located in sidewall 60 of outer member 44. Ports 80 are spaced radially around the circumference of sidewall 60. Ports 80 allow fluid communication between well fluid chamber 64 and well fluids 82 located in well bore 26. Since well fluid chamber 64 is in fluid communication with well bore 26, the volume of well fluid chamber 64 is not constant as pulse generator 34 moves between the contracted and extended position.

Located at the lower end of well fluid chamber 64 is an upward facing shoulder 84. Supported by shoulder 84 is a spring 86. A spring retainer or fluid piston 88 is located above spring 86. A downward facing shoulder 90 protrudes outwardly from sidewall 58 of inner member 42. Spring 86 pushes fluid piston 88 up against shoulder 90. A flange-type stop 92 protrudes inwardly from sidewall 60 of outer member 44. When the inner member 42 and outer member 44 telescope to the extended position, stop 92 strikes against the top of fluid piston 88, as further discussed herein.

Longitudinal splines 94 are located on portions of inner member 42 and outer member 44. Splines 94 allow inner member 42 and outer member 44 to slide relative to each other while also allowing torque to be transmitted from drill string 24 located above pulse generator 34 to drill bit 28 located below pulse generator 34.

As discussed above, pump 104 is connected to selectively pump drill fluid into drill string 24. Passage 98 through drill pipe 30 of drill string 24 is in fluid communication with passage 50 of inner member 42, which in turn is in fluid communication with passage 52 of outer member 44, which is in fluid communication with drill bit orifice 102.

Pulse generator 34 functions as follows. During drilling operations, drill bit 28 is rotating at the bottom of well bore 26 and weight is being applied to pulse generator 34 by drill string 24. The force being applied to pulse generator 34 by drill string 24 maintains inner member 42 and outer member 44 in the contracted position.

When generation of a pulse is desired, the rotation of drill string 24 is interrupted and drill string 24, and consequently inner member 34, are lifted off the bottom of the well a distance greater than the stroke of pulse generator 34. "Bottom of well bore" as used in this patent refers to any location in well bore 26 below which pulse generator 34 may not travel, such as, for example, a structure which obstructs the passage of pulse generator 34, or the actual physical bottom of well bore 26.

Pump 104 is used to pump drill fluid into drill string 24 at a rate sufficient to provide a significant back pressure within drill string 24, even though the well fluid will be flowing out drill bit orifice 102. The back pressure within drill string 24 will generate forces which urge inner member 42 and outer member 44 toward the extended position.

In this preferred embodiment the force provided by the back pressure within drill string 24 is supplemented by the weight of outer member 44, drill collars 32, and drill bit 28. The weight of these members helps to urge outer member 44 to move downward to the extended position.

For inner member 42 and outer member 44 to move from the contracted position to the extended position, lower volume 76 must become larger and upper volume 74 must become smaller. For this to occur, fluid must pass from upper volume 74 to lower volume 76. Since orifice 78 initially causes fluid to pass from upper volume 74 to lower volume 76 at a slow rate, at the beginning of the stroke, outer member 44 can only move very slowly toward the extended position. This causes inner member 42 and outer member 44 to be lifted substantially together for a short time.

FIG. 3 shows inner member 42 lifted to a predetermined height represented by the letter "A". Once inner member 42 is at position A, it is held at that position. As time passes, fluid slowly bleeds from upper volume 74 to lower volume 76. As this occurs, outer member 44 slowly moves toward the extended position, its movement being impeded by the hydraulic action of flange 72 within reduced section 68.

Figure 4:
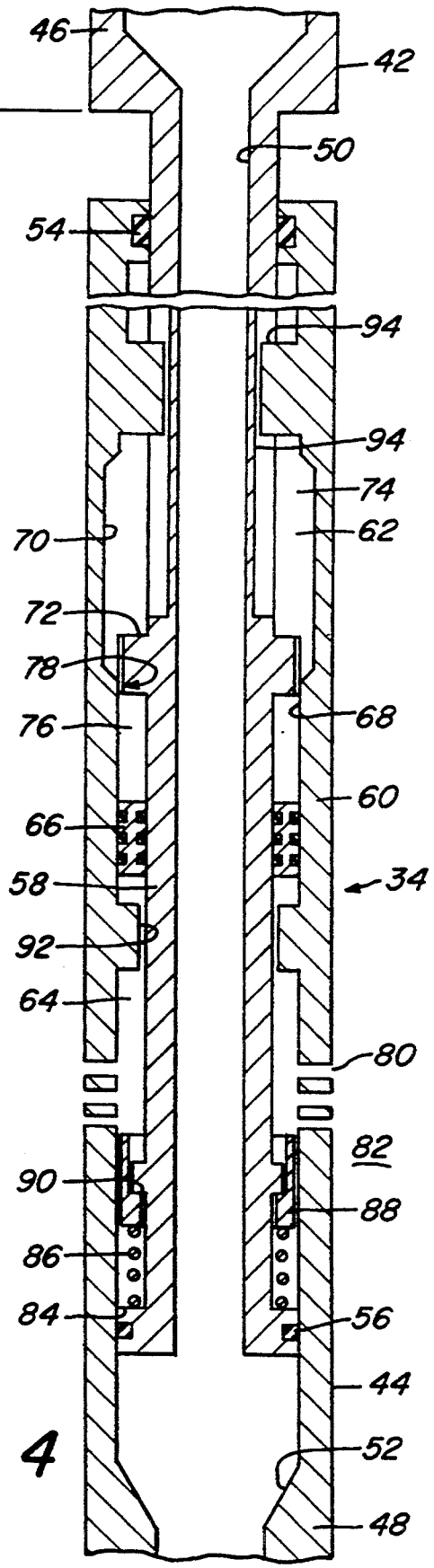
FIG. 4 is a schematic of the apparatus of FIG. 3, but shown in an intermediate position between the contracted position and the extended position, during which the outer member is moving relatively slowly downward.

FIG. 4 shows the relative position of inner member 42 and outer member 44 after the passage of a short time, approximately fifteen seconds. At this point flange 72 is located partially in reduced section 68 and partially in enlarged section 70. Fluid flow between upper volume 74 and lower volume 76 is still restricted.

As soon as flange 72 moves to enlarged section 70, preferably after about twenty seconds from when outer member 44 begins to move toward position B, flow between upper volume 74 and lower volume 76 is no longer restricted. FIG. 5 shows the pulse generator at a point where flange 72 has just completely moved into enlarged section 70 and at which point orifice 78 no longer restricts the flow of fluid between upper volume 74 and lower volume 76. Without the restricted flow, outer member 44 is free to travel rapidly to the extended position. The force of the pump pressure together with the weight of outer member 44, drill collars 32, and drill bit 28 causes outer member 44 to travel quickly and violently to the extended position. FIG. 6 shows pulse generator 34 in the fully extended position.

During the rapid movement of outer member 44 toward the extended position, the volume of well fluid chamber 64 is reduced rapidly because of floating seal 66, which serves as a piston means. A comparison of FIG. 5 and FIG. 6 shows the change in volume. Because well fluid chamber 64 is sealed at the top by floating seal 66 and at the bottom by seal 56, the well fluid which was located within well fluid chamber 64 is expelled out of well fluid chamber 64 through ports 80 in the form of fluid pulse 96 shown in FIG. 6. Ejection ports 80 are sized so that the surfaces of floating seal 66 and fluid piston 88 acting against well fluid 82 in well fluid chamber 64 are much larger than the combined area of ejection ports 80. Such a design criteria will result in fluid pulse 96 having a speed much greater than the speed of the outer member 44 with respect to inner member 42. The size, number, and positioning of ports 80 can be selectively adjusted to change the shape, velocity, and frequency of pulses 96 and seismic waves 36.

As outer member 44 travels to the extended position, stop 92 strikes fluid piston 88, and causes spring 86 to compress. The compression of spring 86 absorbs energy and prevents inner member 42 and outer member 44 from being damaged. Also, the downward movement of retainer or fluid piston 88 due to the impact with stop 92 creates a well defined portion of pulse 96 having desirable characteristics, including desirable frequency characteristics. When pulse generator 34 is in the fully contracted position as shown in FIG. 3, ports 80 are located above fluid piston 88. When pulse generator 34 is in the fully extended position as shown in FIG. 6, ports 80 are located below fluid piston 88.

Pulse 96 causes seismic waves 36, having a frequency from 10 to 120 cycles per second, to propagate away from pulse generator 34 in all directions and to pass through, or reflect from, various earth formations 38. At surface 12, a plurality of seismic sensors 40 are positioned in concentric circles around the surface location of the well bore as shown in FIG. 8. There they detect seismic information useful in determining the geological structure near well bore 26, and other information useful to the drilling operations.

If another pulse 96 is desired, drill string 24 is once again set down on the bottom so that pulse generator 34 returns to the contracted position. Drill string 24 can then once again be raised to position A and held there until another pulse is generated. This process can be repeated indefinitely and composited to cancel undesired interference and improve useful signals.

The above embodiment has been described as having a force means comprising both a pump means and a weight means located below the pulse generator. The weight means is a supplemental force means which can be used in situations where sufficient pressure is not available. Alternatively, the weight means can be used without the pump means.

Figure 7:
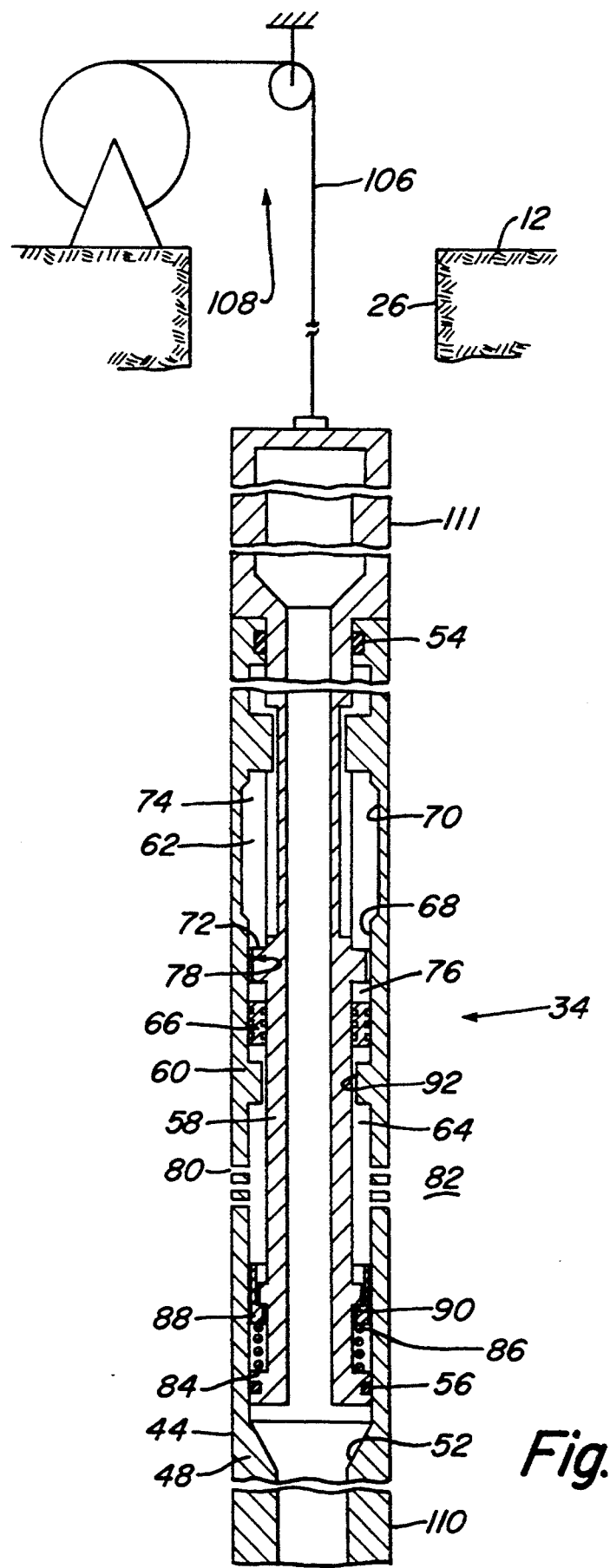
FIG. 7 is a schematic of a vertical cross section of a second embodiment of the present invention for use with a wireline.

FIG. 7 shows a second embodiment of the present invention. Pulse generator 34 is attached to the end of a wireline 106 which is suspended from the surface by conventional means shown only schematically at 108 in FIG. 7. In this embodiment, two or more drill collars 110 are connected to the bottom of outer member 44 of pulse generator 34. Drill collars 110 provide the force needed to urge pulse generator 34 to the extended position. Also, two or more drill collars 111 are connected to the top of inner member 42 of pulse generator 34 to provide the force needed to urge pulse generator 34 to the contracted position.

When generation of a fluid pulse is desired, pulse generator 34 is lowered down well bore 26 by means of wireline 106. As pulse generator 34 is being lowered down well bore 26, inner member 42 and outer member 44 are in the extended position. Pulse generator 34 is lowered to the bottom of well bore 26, or other temporary bottom at a desired location in well bore 26 below which pulse generator 34 or drill collars 110 cannot pass. When drill collars 110 reach bottom, the weight of inner member 42, together with the weight of drill collars 111 connected above it, will urge pulse generator 34 to the contracted position.

Once inner member 42 and outer member 44 reach the contracted position, wireline 106 is used to raise inner member 42 by at least the length of the stroke of pulse generator 34, approximately 24 inches. FIGS. 2-6, which were earlier used to describe the first embodiment, can also be used to describe this embodiment. When flange 72 moves to enlarged region 70, the fluid flow past flange 72 is no longer restricted, thus allowing rapid and violent movement of outer member 42 to the extended position. This fast and violent movement causes the volume of well fluid in well fluid chamber 64 to become rapidly smaller, thus causing the ejection of a fluid pulse from ejection ports 80.

This second and very important embodiment just described is particularly useful in previously drilled wells where the primary objective is to restore production to depleted or partially depleted oil fields. In such applications, other force means such as pump pressure and drill string weight are not available.

The present invention has several advantages. One advantage is that the invention has several embodiments which affords a rig operator great flexibility in selecting a tool for the particular job at hand. For example, if dangerous formations with possible over-pressured gas zones are being drilled, in which case the geologic structure immediately adjacent the drill bit is of utmost importance, the first embodiment (FIG. 2), without drill collars 32, can be used to create the pulse as close as possible to the bottom of the well bore. On the other hand if information from immediately adjacent the drill bit is not paramount, and/or supplemental force is needed to penetrate deeper into the earth, the first embodiment (FIG. 2), with drill collars 32, can be used. Still further, if geological data is required while drilling is not ongoing, such as in a cased well, the second embodiment (FIG. 7) can be used to make lowering and raising of the pulse generator into the well bore much faster and simpler without the need for drilling fluids and high pressure pumps.

Another advantage is that the present invention provides a pulse generator that is simple in design and simple to use. No complex and dangerous gas reservoirs and/or fuel supplies and related connections or valves are required. Also, the pulse generator of the present invention can be operated by simply lowering it to the bottom and then raising it off bottom. No remote triggering is needed, the mere passage of a preselected period of time after lifting the pulse generator off bottom is enough to operate it.

Another advantage is that the spring absorbs a substantial amount of energy when the pulse generator moves to the extended position. This greatly increases the life of the pulse generator by avoiding shock to the components. Also, the corresponding pulse segment created by the fluid expelled through ports 80 by the movement of retainer or fluid piston 88 is well defined and easily identified at the surface.

One of the principal objectives of this invention is to prevent the occurrence of dangerous blowouts by identifying the location and magnitude of over-pressured gas zones before they are penetrated by the drill. However, it will be understood by those skilled in well drilling operations, reservoir management, and exploration activities (particularly geophysics) that a borehole pulse generator of sufficient force and frequencies that can function concurrently while drilling operations are in progress will provide much valuable information to increase the safety and efficiency of drilling oil and gas wells.

The seismic pulses generated by this invention can be expected to provide much valuable geophysical and geological information not now available in drilling wells, such as, for example: (a) delineating position and magnitude of dangerous over-pressured gas zones before they are penetrated by the drill bit; (b) continuously determining position of the drill bit for directional and horizontal wells; (c) mapping geologic structure and stratigraphy around and below the borehole; (d) guiding relief wells to intersect and kill wild wells; (e) providing formation velocities, densities, and porosities continuously while drilling; (f) permitting faster and safer drilling with light weight mud until heavier mud is required; (g) guiding multiple wells drilled from offshore platforms to productive reservoirs; (h) delineating top and bottom of boundaries of reservoirs in horizontal wells; (i) providing three dimensional vertical seismic profiles (VSP) while drilling continues; (j) providing data for extended range three-dimensional cross well tomography for enhanced oil recovery programs; (k) imaging sub-salt geologic structure deep in the earth; and (1) imaging shape and proximity of shallow and deep seated salt domes.

While the invention has been particularly shown and described with reference to a preferred embodiment, it will be understood by those skilled in the art that various changes in form and detail may be made therein without departing from the spirit and scope of the invention.

What is claimed is:

1. An apparatus for generating a fluid pulse in a well containing a well fluid, the apparatus comprising:

a tubular outer member telescopically connected to a tubular concentric inner member, each of the members having a sidewall;

force means for telescopically extending the inner and outer members from a contracted position to an extended position;

a port in the sidewall of the outer member adapted to be in communication with the well fluid;

an annular well fluid chamber located between the sidewalls of the inner and outer members in communication with the port;

delay means for controlling the rate at which the inner and outer members move from the contracted to the extended position so that upon lifting the inner and outer members, the inner and outer members at first move slowly, thus allowing the inner and outer members to be raised substantially together a short distance while in the contracted position, the delay means subsequently allowing the force means to move the inner and outer members quickly to the extended position; and piston means in the well fluid chamber causing the well fluid chamber to increase in volume as the inner and outer members are moved to the contracted position drawing well fluid through the port into the chamber, and causing the well fluid chamber to decrease in volume for rapidly ejecting a fluid pulse outwardly through the port in response to the movement of the inner and outer members to the extended position by the force means.

2. The apparatus according to claim 1 further comprising:

a plurality of sections of drill pipe connected above the inner and outer members, and a drill bit connected below the inner and outer members;

the drill bit having an orifice providing restricted fluid communication between the well and an interior of the drill pipe; and wherein the force means comprises pump means for increasing pressure within the drill pipe for urging the inner and outer members to the extended position.

3. The apparatus according to claim 1 further comprising:

a drill string having a plurality of sections of drill pipe secured above the inner and outer members; and wherein the force means comprises at least one section of drill conduit connected below the inner and outer members and a drill bit at the lower end of the conduit, the weight of the drill conduit providing a force for moving the inner and outer members to the extended position.

4. The apparatus according to claim 1 further comprising:

a wireline suspending the inner and outer members in the well; and wherein the force means comprises at least one weight member connected below the inner and outer members for urging the inner and outer members to the extended position by gravity.

5. The apparatus according to claim 1 wherein the delay means comprises:

an annular, sealed, substantially constant volume, hydraulic fluid chamber formed between the inner and outer members, the hydraulic fluid chamber having an enlarged annular section and a reduced annular section;

a piston-type flange attached to one of the inner and outer members, the flange being located within the reduced annular section of the hydraulic fluid chamber when the members are in a telescopically contracted position, and being located within the enlarged annular section of the hydraulic fluid chamber when the members are in a telescopically extended position;

the flange partitioning the hydraulic fluid chamber into an upper volume and a lower volume, one of the two volumes becoming smaller and another of the two volumes becoming larger during telescoping of the members from the contracted position to the extended position; and bleed-by passage means associated with the flange to allow only a restricted flow of hydraulic fluid between the upper and lower volumes of the hydraulic fluid chamber when the flange is moving within the reduced annular section of the hydraulic fluid chamber and to allow substantially unrestricted flow of hydraulic fluid between the upper and lower volumes of the hydraulic fluid chamber when the flange is moving in the enlarged annular section of the hydraulic fluid chamber, so as to selectively allow slow and fast telescopic movement between the members based on the relative position between the members.

6. The apparatus according to claim 5 wherein the piston means comprises a floating seal sealing the lower end of the hydraulic fluid chamber and separating the hydraulic fluid chamber from the well fluid chamber 7. The apparatus according to claim 1 further comprising spring means located between the inner and outer members for absorbing shock as the inner and outer members reach the extended position.

8. In a drilling assembly having a drilling rig, a drill string having a plurality of sections of drill pipe secured above a plurality of sections of drill collars and a drill bit at the lower end of the collars, a system for obtaining seismic data while drilling a well, the system comprising in combination:

seismic pulse detection means located on the surface and spaced laterally from the drilling rig to detect seismic waves created in the well by fluid pulses and passing through earth formations; and hydraulically triggered pulse generation means connected into the drill string above the drill bit, the pulse generation means comprising telescoping inner and outer members, the outer member having a sidewall with a port formed therein for ejecting a fluid pulse outwardly in response to lifting of the drill string and the drill bit from the bottom of the well.

9. The system according to claim 8 wherein the pulse generation means further comprises pump means for increasing pressure within the drill string for actuating said hydraulic triggering means.

10. The system according to claim 8 wherein the pulse generation means is spaced from the drill bit by at least one of the drill collars and wherein the weight of said drill collar below the pulse generation means at least in part actuates said hydraulic triggering means.

11. The system according to claim 8 wherein:

the inner and outer members are in a contracted position when the bit is on the bottom and move to an extended position when the bit is off bottom; and wherein the pulse generation means further comprises:

delay means for retarding the inner and outer members from rapidly moving to the extended position until a selected time interval after the drill bit is off bottom, then for allowing the members to rapidly move to the extended position due to weight in the drill string below the inner and outer members; and piston means for expelling the pulse when the members move from the contracted position to the extended position.

12. The system according to claim 8 wherein the pulse generation means comprises:

an annular, sealed, substantially constant volume, hydraulic fluid chamber formed between the inner and outer members, the hydraulic fluid chamber having an enlarged annular section and a reduced annular section;

a piston-type flange attached to one of the inner and outer members, the flange being located within the reduced annular section of the hydraulic fluid chamber when the members are in a telescopically contracted position, and being located within the enlarged annular section of the hydraulic fluid chamber when the members are in a telescopically extended position;

the flange partitioning the hydraulic fluid chamber into an upper volume and a lower volume, one of the two volumes becoming smaller and another of the two volumes becoming larger during telescoping of the members from the contracted position to the extended position; and bleed-by passage means associated with the flange to allow only a restricted flow of hydraulic fluid between the upper and lower volumes of the hydraulic fluid chamber when the flange is moving within the reduced annular section of the hydraulic fluid chamber and to allow substantially unrestricted flow of hydraulic fluid between the upper and lower volumes of the hydraulic fluid chamber when the flange is moving in the enlarged annular section of the hydraulic fluid chamber, so as to selectively allow slow and fast telescopic movement between the members based on the relative position between the members.

13. The system according to claim 8 wherein the pulse generation means comprises:

an annular, variable volume, well fluid chamber formed between the inner and outer members, the chamber being in communication with well fluids in the well through the port in the outer member;

an annular, sealed, substantially constant volume, hydraulic fluid chamber formed between the inner and outer members;

a floating seal sealing the lower end of the hydraulic fluid chamber and separating the hydraulic fluid chamber from the well fluid chamber;

the outer member being movable relative to the floating seal, the inner member being substantially stationary relative to the floating seal; and the well fluid chamber having a larger volume when the members are in a telescopically contracted position and a smaller volume when the members are in the extended position, so that when the members rapidly telescope from the contracted to the extended position due to the weight of a lower portion of the drill string, the well fluid chamber rapidly contracts thus ejecting well fluid from the port and creating the fluid pulse outwardly from the outer one of the members.

14. The system according to claim 8 further comprising:

a spring in the well fluid chamber above a lower end of the well fluid chamber;

a fluid piston on the upper end of the spring; and a flange-type stop mounted to one of the members for movement therewith, the stop striking the fluid piston when the members move to a telescopically extended position.

15. The system according to claim 8 further comprising:

a spring in the well fluid chamber above a lower end of the well fluid chamber;

a fluid piston on the upper end of the spring;

a flange-type stop mounted to one of the members for movement therewith, the stop striking the fluid piston when the members move to a telescopically extended position;

an annular, sealed, substantially constant volume, hydraulic fluid chamber formed between the inner and outer members, the hydraulic fluid chamber having an enlarged annular section and a reduced annular section;

a piston-type flange attached to one of the inner and outer members, the flange being located within the reduced annular section of the hydraulic fluid chamber when the members are in a telescopically contracted position, and being located within the enlarged annular section of the hydraulic fluid chamber when the members are in a telescopically extended position;

the flange partitioning the hydraulic fluid chamber into an upper volume and a lower volume, one of the two volumes becoming smaller and another of the two volumes becoming larger during telescoping of the members from the contracted position to the extended position; and bleed-by passage means associated with the flange to allow only a restricted flow of hydraulic fluid between the upper and lower volumes of the hydraulic fluid chamber when the flange is moving within the reduced annular section of the hydraulic fluid chamber and to allow substantially unrestricted flow of hydraulic fluid between the upper and lower volumes of the hydraulic fluid chamber when the flange is moving in the enlarged annular section of the hydraulic fluid chamber, so as to selectively allow slow and fast telescopic movement between the members based on the relative position between the members.

16. An apparatus for connection to a string for generating a fluid pulse in a well containing a well fluid, the apparatus comprising:

a tubular inner member having an upper end adapted to be connected to the string;

a tubular outer member carried by the inner member and having a sidewall;

the inner and outer members being movable between a contracted position and an extended position;

an annular, sealed, substantially constant volume, hydraulic fluid chamber formed between the inner and outer members, the hydraulic fluid chamber having an enlarged annular section and a reduced annular section;

an annular, variable volume, well fluid chamber formed between the inner and outer members;

an axially movable floating seal sealingly separating the hydraulic fluid chamber and the well fluid chamber;

an ejection port in the sidewall of the outer tubular member, placing the well fluid chamber in communication with well fluids in the well;

a piston-type flange attached to the inner member, the flange being located within the reduced annular section of the hydraulic fluid chamber when the members are in the contracted position, and being located within the enlarged annular section of the hydraulic fluid chamber when the members are in the extended position;

the flange partitioning the hydraulic fluid chamber into an upper volume and a lower volume, one of the two volumes becoming smaller and the other of the two volumes becoming larger during telescoping of the members from the contracted position to the extended position;

bleed-by passage means associated with the flange to allow only a restricted flow of hydraulic fluid between the upper and lower volumes of the hydraulic fluid chamber when the flange is moving within the reduced annular section of the hydraulic fluid chamber and to allow substantially unrestricted flow of hydraulic fluid between the upper and lower volumes of the hydraulic fluid chamber when the flange is moving in the enlarged annular section of the hydraulic fluid chamber, so that when the members are in the contracted position and the inner member is lifted to a predetermined position, the outer member is at first moved downward only slowly because of the restricted flow past the flange, but when the flange reaches the enlarged annular section, the outer member will be rapidly moved downward because of the unrestricted flow past the flange;

a fluid piston located in the well fluid chamber;

a spring in the well fluid chamber supporting the fluid piston above a lower end of the well fluid chamber;

a flange-type stop mounted to an inside wall of the outer member for movement therewith, the stop striking the fluid piston when the outer member moves to the extended position, compressing the spring; and the rapid reduction in volume of the well fluid chamber as the members move to the extended position generating a fluid pulse outwardly from the ejection port of the outer member.

17. The apparatus according to claim 16 wherein:
the fluid piston is an annular member carried slidingly around the inner member;
a shoulder on the inner member is located above the fluid piston; and
the spring pushes the fluid piston up against the shoulder.

18. The apparatus according to claim 16 wherein the ejection port is located above the fluid piston when the members are in the contracted position and moves below the fluid piston only when the members are in the extended position.

19. The apparatus according to claim 16 wherein:
the string is a drill pipe having a passage therein for the flow of drilling fluids;
the inner member has a passage therethrough for the drilling fluids;
a drill bit is located below the apparatus; and wherein pumping drill fluid through the drill pipe and out the drill bit applies pressure on the apparatus to cause the inner and outer members to move to the extended position.

20. The apparatus according to claim 16 further comprising at least one conduit below the lower end of the outer member, the weight of the conduit assisting in pulling the outer member downward to the extended position.

21. The apparatus according to claim 16 wherein the string is a cable which supports the apparatus in the well and wherein the apparatus further comprises:
at least one weight member below the lower end of the outer member, the weight of the weight member assisting in pulling the outer member downward to the extended position.

22. The apparatus according to claim 16 wherein the string comprises drill pipe and wherein the apparatus further comprises:
splines extending from one of the two tubular members, the splines oriented axially along said one member; and
grooves in another of the tubular members for engagement with the splines to allow both telescopic movement and transfer of torque between the members.

23. A method of generating a pulse in a well, comprising the steps of:
coupling tubular inner and outer members telescopically together and to a string;
providing an ejection port in a sidewall of the outer tubular member;
providing an annular well fluid chamber between the inner and outer members;
lowering the members on the string down the well to move the members from an extended position to a contracted position; then, when it is desired to create a pulse,
lifting the string and hydraulically controlling the rate at which the inner and outer members move from the contracted to the extended position so that upon lifting, the members at first move apart slowly, thus allowing the members to be raised a short distance substantially together, and subsequently allowing the members to move apart rapidly to the extended position, decreasing the volume of the well fluid chamber and causing a fluid pulse to be expelled outwardly from the ejection port.

24. The method according to claim 23, wherein the string is a drill string having a plurality of sections of drill pipe, the method further comprising the steps of:
connecting the members to a drill bit which provides restricted fluid communication between the well and an interior of the drill string; and
providing fluid pressure within the drill string to urge the members to the extended position after lifting the string.

25. The method according to claim 23, wherein the string is a drill string having a plurality of sections of drill pipe, the method further comprising the steps of:
connecting the members above at least one section of drill collar; and
wherein the weight of the drill collar assists the members in telescoping to the extended position after lifting the string.

26. The method according to claim 23, wherein the string comprises a wireline; and
wherein the method further comprises connecting at least one weight member below the inner and outer members, wherein the weight of the weight member urges the members to the extended position.

* * * * *